United States Patent [19]

Elmore, Jr.

[11] 4,304,813
[45] Dec. 8, 1981

[54] PRESSURE SENSITIVE TAPE WITH A WARP KNIT AND WEFT INSERTION FABRIC

[75] Inventor: Roland G. Elmore, Jr., Spartanburg, S.C.

[73] Assignee: Milliken Research Corporation, Spartanburg, S.C.

[21] Appl. No.: 168,052

[22] Filed: Jul. 14, 1980

[51] Int. Cl.³ .................... B32B 7/00; D04B 1/00
[52] U.S. Cl. .................... 428/253; 428/254; 428/261; 428/257; 428/354; 66/193
[58] Field of Search ............ 428/253, 254, 261, 258, 428/354, 40, 906, 246, 343, 257; 66/193

[56] References Cited

U.S. PATENT DOCUMENTS

| | | | |
|---|---|---|---|
| 997,125 | 7/1911 | Gleason | 428/212 |
| 1,322,257 | 11/1919 | Miller | 428/347 |
| 1,368,025 | 2/1921 | Diamond | 428/250 |
| 1,455,744 | 5/1923 | Diamond | 428/250 |
| 2,000,475 | 5/1935 | O'Donnell | 428/246 |
| 2,349,709 | 5/1944 | Evans | 428/196 |
| 2,352,463 | 6/1944 | Wenzelberger et al. | 428/255 |
| 2,415,276 | 2/1947 | Buckley et al. | 428/246 |
| 2,523,865 | 9/1950 | Dildilian | 428/258 |
| 2,561,063 | 7/1951 | McBurney et al. | 428/242 |
| 2,561,064 | 7/1951 | Ness | 428/248 |
| 2,561,362 | 7/1951 | Guillot | 428/354 |
| 2,598,090 | 5/1952 | Yung et al. | 428/252 |
| 2,692,842 | 10/1954 | Dildilian | 428/62 |
| 2,750,314 | 6/1956 | Bemmels | 428/282 |
| 2,750,315 | 6/1956 | Tierney | 428/354 |
| 3,232,291 | 2/1966 | Parker | 128/156 |
| 3,483,018 | 12/1969 | Waldman | 428/286 |
| 3,552,994 | 1/1971 | Dipner | 428/247 |
| 3,658,574 | 4/1972 | Izzi et al. | 428/226 |
| 3,972,768 | 8/1976 | Hill | 156/545 |
| 4,183,993 | 1/1980 | Benstead et al. | 428/253 |

*Primary Examiner*—Richard L. Schilling
*Assistant Examiner*—John L. Goodrow
*Attorney, Agent, or Firm*—Earle R. Marden; H. William Petry

[57] ABSTRACT

A pressure sensitive tape composed of a polyethylene base film; a warp knit, weft inserted, continuous filament substrate and a pressure sensitive adhesive applied to the film through the substrate.

3 Claims, 3 Drawing Figures

U.S. Patent  Dec. 8, 1981  4,304,813
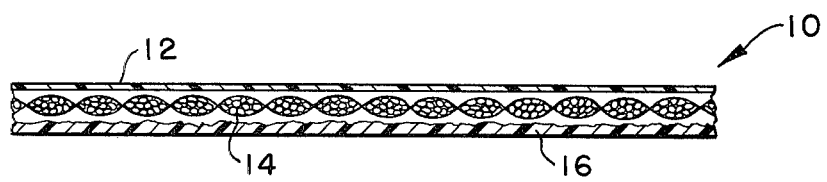
FIG.-1-
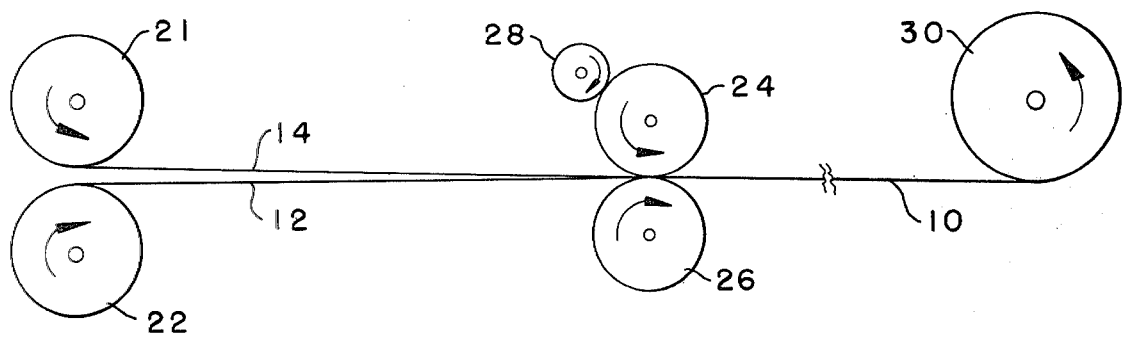
FIG.-2-
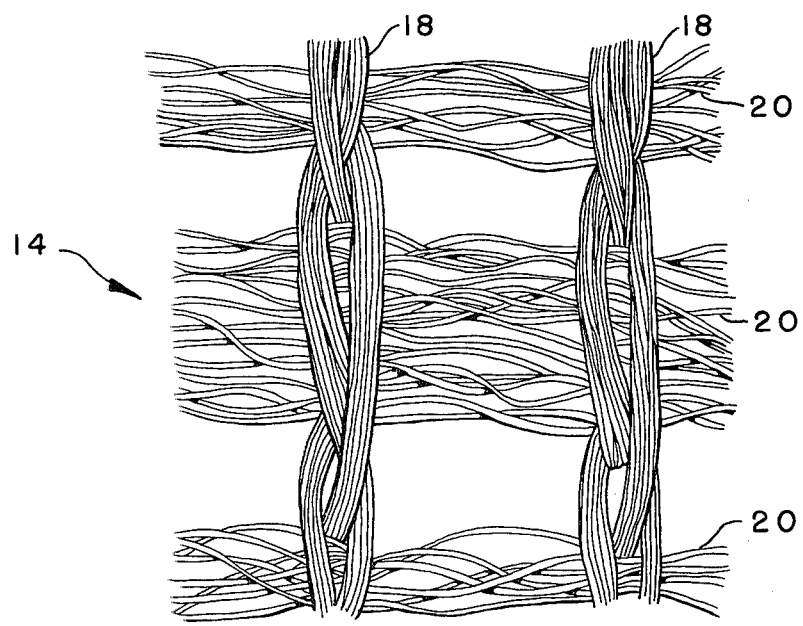
FIG.-3-

PRESSURE SENSITIVE TAPE WITH A WARP KNIT AND WEFT INSERTION FABRIC

Pressure sensitive tapes are well known in the commercial world but have had disadvantages due to strength, cost and tear-ability in use. Most such tapes have employed woven fabrics as the carrier fabric placed between the backing material and the pressure sensitive adhesive.

It is, therefore, an object of the invention to provide a pressure sensitive tape which is economical to produce, is light weight, can readily be separated from the roll of tape and has an even coat of pressure sensitive adhesive on the adhesive side of the fabric.

Other objects and advantages of the invention will become readily apparent as the specification proceeds to describe the invention, with reference to the accompanying drawings, in which:

FIG. 1 is a cross-sectional, schematic view of the new and improved pressure sensitive tape;

FIG. 2 is a top or loop side view of the carrier fabric used in the tape of FIG. 1; and FIG. 3 is a schematic view of the method of fabricating the tape of FIG. 1.

As is well known in the trade, the pressure sensitive tape 10 will be manufactured in wide widths and then cut to the desired width for the desired use. As shown in FIG. 1, the tape 10 consists of a base layer of a three millimeter polyethylene film 12, a carrier layer of a warp knit, weft insertion fabric 14 and a layer of a pressure sensitive adhesive 16.

The carrier fabric 14, illustrated in FIG. 2, is a warp knit, weft insertion fabric with a chain stitch 18 knit, base construction using a 40 denier, continuous filament, polyester yarn while the weft inserted yarn 20 is a 150 denier, textured, polyester continuous filament yarn to provide a 100% synthetic carrier fabric.

The fabric from which the tape 10 is slit is produced in the manner shown in FIG. 3. As shown in FIG. 3, the carrier fabric 14 is supplied from a supply roll 21 and mates with the polyethylene film 12 from the supply roll 22 at the nip of the calender rolls 24 and 26. Calender roll 24 is supplied, by kiss roll 28, a rubber gum pressure sensitive adhesive which is pressed into and through the fabric 14 to laminate the fabric 14 to the base film 12 to provide the pressure sensitive tape 10 when allowed to set after passing through the nip of calender rolls 24 and 26. The completed tape is then taken up on take-up roll 30. The rubber gum adhesive is any of the so-called commercially available pressure sensitive adhesives.

The resultant tape made from the above method provides a tape that is light-weight and, beceause of the open construction of the carrier fabric 14, provides a tape on which the adhesive is more evenly distributed. Furthermore, as compared to prior art tapes, the warp knit, weft insertion carrier fabric allows more even distribution of the pressure sensitive adhesive with the application of less adhesive. Also, the resultant fabric is of lighter gauge and can be readily torn from the roll.

Although the specific tape has been described, it is contemplated that changes may be made without departing from the scope or spirit of the invention, and I desire to be limited only by the scope of the claims.

I claim:

1. A pressure sensitive tape comprising: a layer of plastic film, a layer of warp knit, weft inserted, all synthetic fabric laminated to said film and a pressure sensitive adhesive adjacent to said fabric and connected to said fabric and said film.

2. The tape of claim 1 wherein said film is polyethylene.

3. The tape of claim 1 wherein said synthetic yarns are polyester.